United States Patent [19]
Evens

[11] B 4,013,423
[45] Mar. 22, 1977

[54] FLUID CAT CRACKER APPARATUS
[75] Inventor: David A. Evens, Cloquet, Minn.
[73] Assignee: Continental Oil Company, Ponca City, Okla.
[22] Filed: Oct. 24, 1974
[21] Appl. No.: 517,668
[44] Published under the second Trial Voluntary Protest Program on April 6, 1976 as document No. B 517,668.
[52] U.S. Cl. .............................. 23/288 S; 208/164; 251/214; 277/112
[51] Int. Cl.² .................................................. B01J 8/24
[58] Field of Search ................. 251/214; 277/112; 208/164; 23/288 S

[56] References Cited
UNITED STATES PATENTS

| | | | |
|---|---|---|---|
| 3,527,694 | 9/1970 | Luckenbach | 208/164 |
| 3,556,472 | 11/1968 | Grove et al. | 251/214 |
| 3,582,041 | 6/1971 | Priese | 251/214 |
| 3,831,900 | 8/1974 | Matousek et al. | 251/214 |

*Primary Examiner*—Herbert Levine
*Attorney, Agent, or Firm*—Richard W. Collins

[57] ABSTRACT

A fluid cat cracker process and apparatus including at least one shutoff valve having improved valve stem guide apparatus. The valve stem guide apparatus comprises a guide member adapted to be attached within the valve body through which the valve stem is disposed. A plurality of annular grooves positioned one above the other are provided in the interior of the guide member and a plurality of expansible seal rings are disposed in the grooves. The seal rings are of a size and shape such that a seal is provided between the valve stem and the surfaces of the grooves whereby pressurized materials within the valve body are prevented from flowing through the valve stem guide apparatus.

2 Claims, 7 Drawing Figures

FLUID CAT CRACKER APPARATUS

BACKGROUND OF THE INVENTION

1. Field of the Invention

The present invention relates to an improved fluid catalytic cracker process and apparatus, and more particularly, but not by way of limitation, to apparatus for carrying out petroleum catalytic cracking processes and other similar processes including shutoff valves having improved valve stem guide apparatus.

2. Description of the Prior Art

Many various types and kinds of valves have been developed for a variety of applications. In the petroleum, chemical and other similar industries, fluid flow control valves operated by hand or by pneumatic, electric or hydraulic operators are commonly used. In many instances such valves are closed or opened only on occasions such as during an emergency or during the start-up or shut-down of associated equipment. For example, in petroleum refineries, slide valves and gate valves are commonly used in conduits leading fluid at high pressures and temperatures between vessels, reactors and other units. These valves remain open during normal operations and are closed only when an emergency arises or when other shut-downs occur. Often, such valves continuously remain in the open position for extremely long periods of time.

Heretofore, valve stem seizure problems have been encountered with valves in the above-described service, particularly those through which fluids and solid materials at high temperatures and/or pressures flow for long periods of time. These problems are primarily due to the pressurized fluids and solid materials entering the valve stem packing gland area and other areas of close clearance between the valve stem and valve body. After entering such close clearance areas, the materials solidify or degrade or cause corrosion of the valve stem, bringing about valve stem seizure when the valve is attempted to be closed. Since many such valves are operated by automatic operators activated by emergency shut-down devices, failure of such valves due to valve stem seizure is extremely hazardous to the safety of equipment and personnel.

A particular problem is encountered in petroleum catalytic cracking processes and apparatus of the fluidized catalyst type. The apparatus must include shutoff valves through which hot regenerated catalyst or mixtures of hot oil and unregenerated catalyst flow. The shutoff valves are in addition to flow control valves which are used to control process variables, and are used only during emergency or normal shut-down and start-up procedures. Consequently, such shutoff valves often remain in the fully open position for long periods of time during which portions of the catalyst or catalyst-oil mixtures flowing through the valves at high temperatures find their way into areas of close clearance between the valve stem and the valve body, i.e., the valve bonnet and valve stem packing gland areas. Because these areas of the valve are relatively cooler than the hot catalyst-oil materials flowing through the valve, the materials in the cooler areas solidify into a cement-like substance which causes the valve stem to become immovable. Also, shutoff valves through which catalyst particles flow with or without oil in admixture therewith often become immobile due to the abrasive catalyst entering areas of close clearance between the valve stem and valve body causing the valve stem to stick due to abrasion and galling.

By the present invention an improved valve stem guide apparatus is provided particularly suitable for use in slide, gate and other valves utilized in apparatus for carrying out fluid catalytic cracking processes as well as other processes, which apparatus prevents pressurized fluids and materials passing through the valve body from flowing through the guide apparatus into areas of close clearance between the valve stem and valve body.

SUMMARY OF THE INVENTION

In one aspect, this invention provides an improved petroleum fluid catalytic cracking process wherein particulated catalyst is circulated between a fluidized catalyst reaction zone and a catalyst regeneration zone and wherein at least one shutoff valve is utilized in said process for shutting off said catalyst circulation including a valve stem guide apparatus which prevents catalyst or catalyst-oil mixtures from flowing through said valve stem guide apparatus and into areas of close clearance between the valve stem and the body of said valve.

In another aspect of the invention, improved apparatus for carrying out a petroleum fluid catalytic cracking process is provided which apparatus includes at least one shutoff valve through which particulated catalyst and catalyst-oil mixtures flow and which includes valve stem guide apparatus which prevents the catalyst and catalyst-oil mixture from entering areas of close clearance within the valve.

In yet another aspect, this invention provides an improved valve assembly and an improved valve stem guide apparatus for attachment within a valve body, the valve stem guide apparatus comprising a cylindrical guide member through which the valve stem is disposed including at least one annular groove positioned in the interior thereof and at least one expansible seal ring disposed in the groove, the seal ring being of a size and shape such that a seal is provided between the valve stem and the surfaces of the groove whereby pressurized materials within the valve body are prevented from flowing through the valve stem guide apparatus.

It is, therefore, a general object of the present invention to provide an improved fluid cat cracker process and apparatus.

A further object of the present invention is the provision of an improved valve assembly for use as a shut-off valve in a petroleum fluid catalytic cracking process whereby pressurized materials flowing through said valve assembly are prevented from entering areas of close clearance between the valve stem and valve body of said assembly.

Yet a further object of the present invention is the provision of an improved valve stem guide apparatus for use within a valve body which provides a fluid tight seal between the apparatus and the valve stem.

Still a further object of the present invention is the provision of an improved valve assembly including a valve stem guide apparatus which prevents pressurized fluids from flowing through the guide apparatus into areas of close clearance between the valve stem and valve body thereby preventing consequent valve stem seizure and operating failures.

Other and further objects, features and advantages of the invention will be readily apparent to those skilled in the art upon a reading of the description of preferred

BRIEF DESCRIPTION OF THE DRAWINGS

FIG. 7 is a simplified flow diagram of a petroleum fluid catalytic cracking apparatus embodying the present invention.

DESCRIPTION OF PREFERRED EMBODIMENTS

Figure 1:
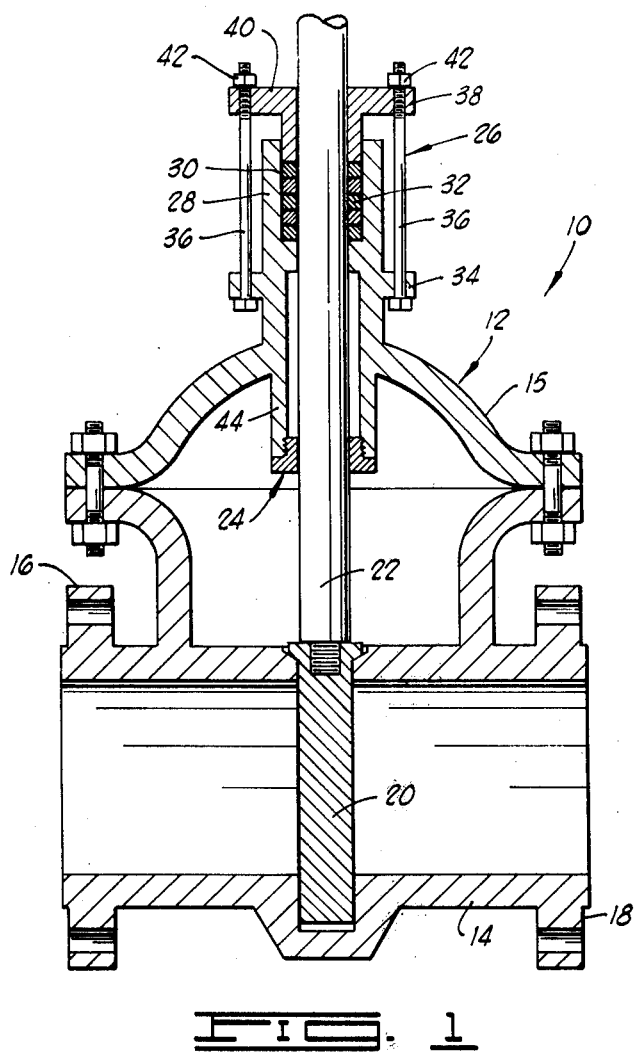
FIG. 1 is a side elevational view of a valve assembly including the improved valve stem guide apparatus of the present invention taken in cross section.

Referring now to the drawings and particularly to FIG. 1, an improved valve assembly including the valve stem guide apparatus of the present invention is illustrated and generally designated by the numeral 10. As will be understood, the valve assembly 10 can be any of a variety of valves such as slide valves, gate valves, or other top guided or top and bottom guided valves. Such valves generally include a valve body 12 having a conduit portion 14 adapted to be connected into a conduit system such as by inlet and outlet flanges 16 and 18 respectively, and a bonnet portion 15. A movable inner valve or closure member 20 is interposed between the inlet and outlet of the conduit portion 14 of the valve body 12. As is well understood, the closure member 20 and conduit portion 14 are provided with complementary seating surfaces so that when the closure member 20 is moved to the closed position as illustrated in FIG. 1, sealing contact between the seating surfaces is made, thereby closing off the flow of fluids and pressure through the conduit portion 14 of the valve body 12.

The closure member 20 is connected to a valve stem 22, either as an integral part thereof or by connecting means such as conventional threads. The valve stem 22 is slidably disposed through the bonnet portion 15 of the valve body 12 and is connected to an operator which functions to open or close the valve assembly 10 by reciprocating the valve stem 22. As shown in FIG. 1, a valve stem guide means of this invention generally designated by the numeral 24 is provided within the valve body 12 for guiding the valve stem 22 and closure member 20 during the reciprocation thereof and for providing a seal between the apparatus and the valve stem. Valve stem sealing or packing gland means 26 are provided for preventing the escape of pressurized fluids contained within the valve body 12 to the exterior thereof. The packing gland means 26 are comprised of an elongated cylindrical housing 28 which is an integral part of the bonnet portion 15 of the body 12 through which the valve stem 22 is slidably disposed. A cylindrical recess 30 is provided at the upper end of the housing 28 within which conventional packing material 32 is disposed. That is, the packing material 32 is positioned between the valve stem 22 and the interior of the housing 28. An annular flange 34 including spaced openings around the periphery thereof through which bolts 36 are disposed is attached to the lower outside portion of the housing 28. A packing compressor sleeve 38 is provided having a central opening therein through which the stem 22 passes. The lower end of the sleeve 38 is adapted to fit within the recess 30 of the housing 28 on top of the packing 32 and includes an upper flange portion 40 having a plurality of spaced openings around the periphery thereof through which the upper ends of the bolts 36 pass. Conventional nuts 42 are threadedly connected to the bolts 36 above the flange portion 40 of the sleeve 38. As will be understood, the nuts 42 are uniformly tightened on the bolts 36 to move the packing compressor sleeve 38 downwardly thereby compressing the packing 32 within the recess 30 causing it to expand into sealing contact with the valve stem 22 and the internal surfaces of the housing 28. As will be understood by those skilled in the art, a variety of valve stem seals and packing glands have been developed for use in conventional valve assemblies, and it is not intended that this invention be limited to use with any particular type of valve stem seal means.

The valve stem guide means 24 can also take a variety of conventional forms, but generally includes a cylindrical bearing surface through which the valve stem 22 is slidably disposed. In the form illustrated in FIG. 1, the valve stem guide means is threadedly attached to an internal cylindrical housing 44 which is an integral part of the bonnet portion 15 of the valve body 12 and which extends downwardly below the housing 28. The guide means 24 functions to guide or retain the valve stem 22 in a fixed position with respect to the valve body 12 when reciprocated and to seal out liquids and solids contained within the valve body 12 and bonnet portion 15 thereof as will be described further hereinbelow.

Figure 2:
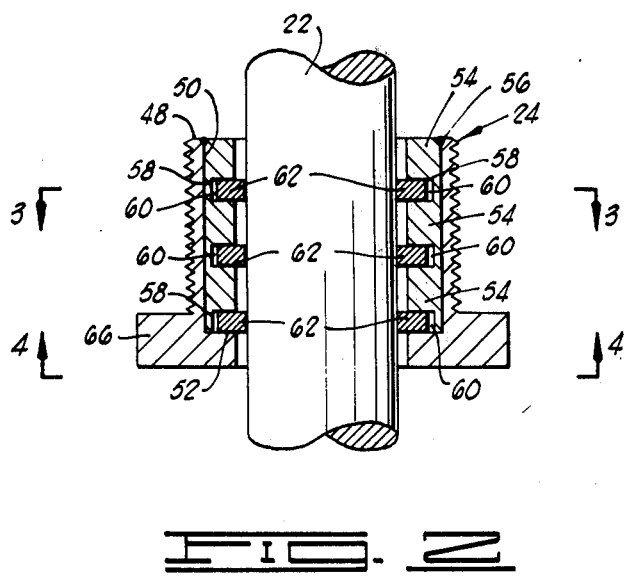
FIG. 2 is an enlarged sectional view of the valve stem guide apparatus of FIG. 1.

Referring now to FIG. 2, the improved valve stem guide apparatus of this invention is illustrated in detail and generally designated by the numeral 24. The valve stem guide apparatus 24 includes a cylindrical guide member 48 having conventional threads formed in the upper outside peripheral surface thereof. The lower end of the guide member 24 is formed into a six-sided flange or hexhead 66 for facilitating threadedly connecting it to complementary threads disposed in the housing 44 (FIG. 1), or other threaded recess in a conventional valve for receiving a valve stem guide apparatus. As will be understood, the valve stem guide apparatus of this invention can include other means for attachment to a valve body or can be incorporated into a valve body as an integral part thereof.

The guide member 48 includes a cylindrical bore axially positioned therein through which the valve stem 22 passes. In the embodiment illustrated in FIG. 2, a counterbore forming a cylindrical recess 50 in the interior of the guide member 48 is provided which includes an upwardly facing annular shoulder 52 near the lower end of the guide member 48. A plurality of annular spacing members 54 are positioned one above the other in the recess 50, the top spacing member 54 being attached to the guide member 48 such as by spot welds 56. Each of the spacing members 54 includes a counterbore forming an annular recess 58 at the lower end thereof so that when the spacing members are stacked one above the other within the recess 50 as illustrated in FIG. 2, a plurality of annular grooves 60 lying in planes transverse to the axis of the guide member 48 are provided in the interior thereof.

Figure 5:
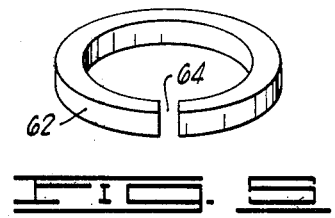
FIG. 5 is a perspective view of one of the seal rings shown in FIGS. 2 and 3.
Figure 4:
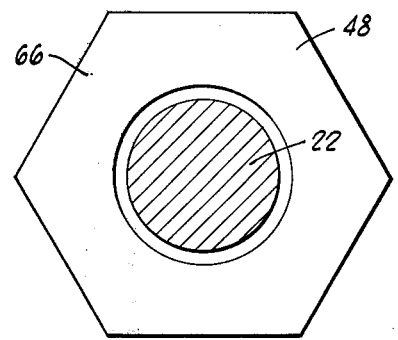
FIG. 4 is a sectional view taken along line 4—4 of FIG. 2.
Figure 4:
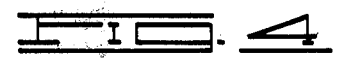
Figure 3:
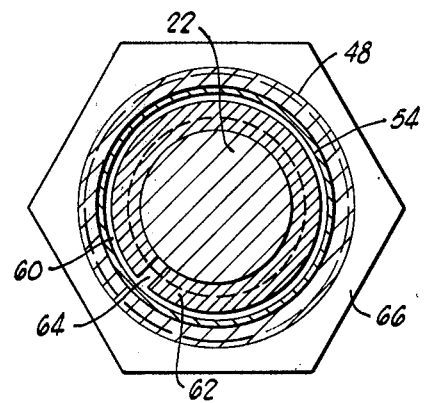
FIG. 3 is a sectional view taken along line 3—3 of FIG. 2.
Figure 3:
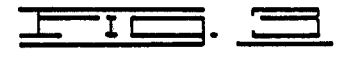
Figure 2:
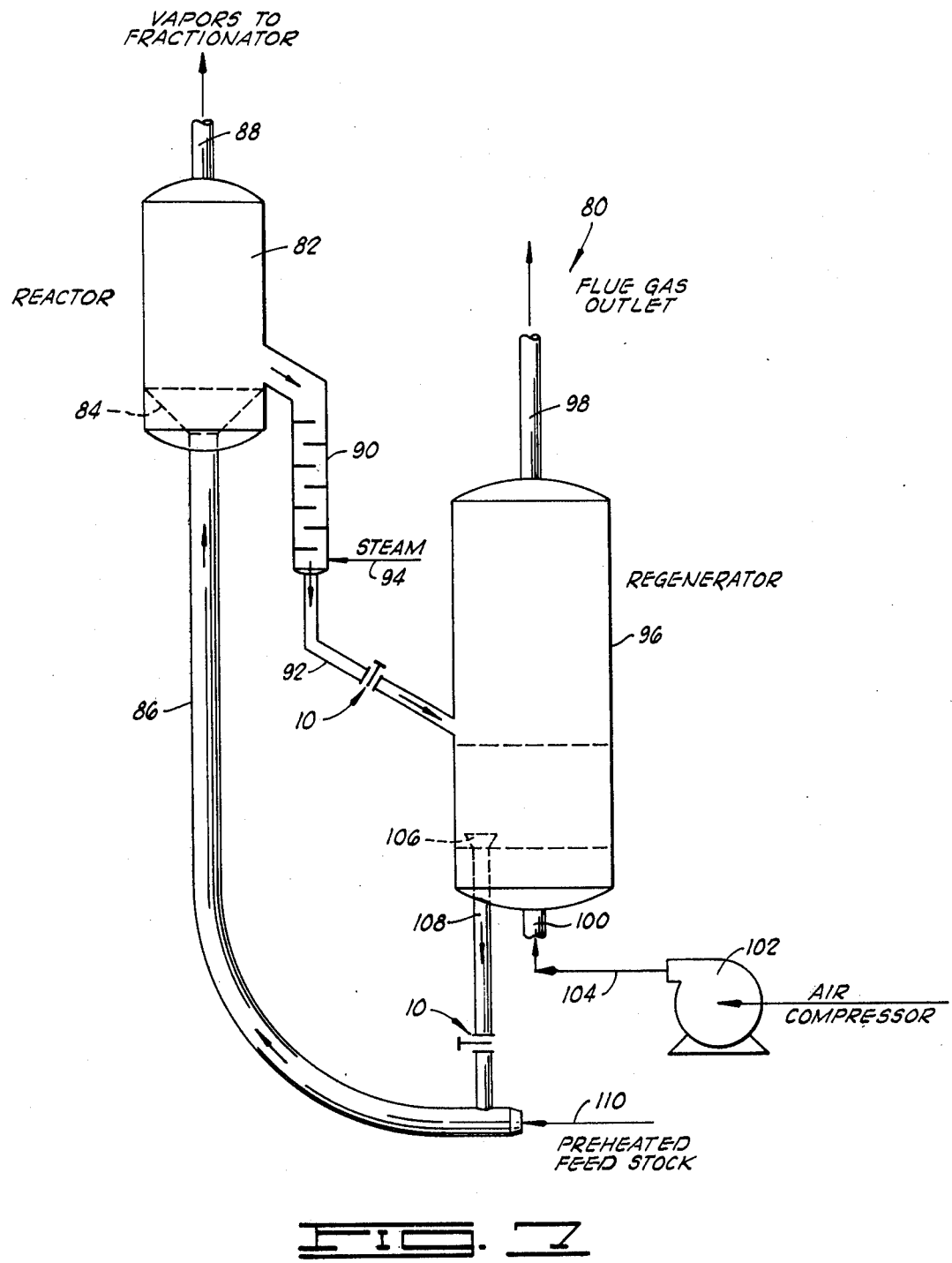

A plurality of expansible annular seal rings 62 are disposed in the grooves 60. As shown in FIGS. 2, 3 and 5, the seal rings 62 are preferably rectangular in cross sectional shape and are of a size whereby a sliding seal is provided between the outside surface of the valve stem 22 and the interior surfaces of the grooves 60. Each of the seal rings 62 includes a discontinuity 64 so that it can be expanded over the outside peripheral surface of the valve stem 22.

Figure 6:
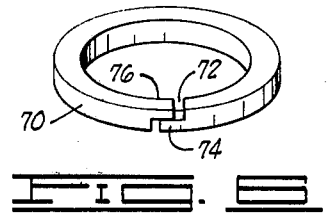
FIG. 6 is a perspective view of an alternate preferred seal ring particularly suitable for use in accordance with the present invention.

Referring now to FIG. 6, a preferred seal ring 70 for use in the apparatus 24 is illustrated. The seal ring 70 includes a discontinuity 72 therein, but the ends of the seal ring forming the discontinuity include adjacent cut-out portions thereby forming intermeshing stepped portions 74 and 76 which sealingly contact each other and prevent leakage through the discontinuity 72.

OPERATION OF THE APPARATUS 24

In assembling the valve stem guide apparatus 24, the spacing members 54 and expansible seal rings 62 or 70 are first fitted together and then positioned in the recess 50 of the guide member 48. As mentioned above, the top spacing member 54 is then attached to the guide member 48 such as by spot welds 56 which maintains all of the spacing members 54 and seal rings 62 or 70 within the guide member 48. The apparatus 24 is then fitted over the valve stem 22 and threadedly connected to the valve body 12 as shown in FIG. 1. As will be understood, a conventional ring expander tool can be utilized for expanding the seal rings when the guide member 24 is positioned over the valve stem 22.

As will now be apparent, in operation of the valve assembly 10 including the valve stem guide apparatus 24, the valve stem 22 is free to reciprocate, i.e., raise and lower the closure member 20, but pressurized fluids and solid particles within the valve body 12 are prevented from entering the close clearance areas between the interiors of the housings 28 and 44 of the valve body 12 and the valve stem 22. The seal rings maintain a seal between the peripheral surfaces of the valve stem 22 and the inside surfaces of the grooves 60. Thus, the valve assembly 10 can remain in the open position for long periods of time with pressurized fluids and solids passing through the conduit portion 14 thereof without such materials entering areas of close clearance and solidifying therein or otherwise causing the valve stem 22 to seize.

Referring now to FIG. 7, apparatus for carrying out a petroleum catalytic cracking process is illustrated and generally designated by the numeral 80. The apparatus 80 is referred to in the art as a "fluid catalytic cracking" unit because the catalyst utilized is in finely divided form and is suspended by the flow of vaporized feed stock in a manner such that a fluidized bed of the catalyst results. More specifically, the apparatus 80 includes a vertical reactor vessel 82 having a distribution grid 84 disposed therein connected to an upstanding feed riser 86. An outlet conduit 88 is connected to the top portion of the reactor 82 for conducting cracked vaporized feed stock to refining and fractionating equipment. A steam stripping column 90 is provided connected at its top end to a side of the reactor 82 and at its bottom end to a conduit 92. A conduit 94 connected to a source of steam is connected to the bottom portion of the steam stripper 90 for injecting steam thereinto. A catalyst regeneration vessel 96 is provided and the conduit 92 is connected to a side thereof. A flue gas outlet conduit 98 is connected to the top of the regenerator vessel 96 and a conduit 100 for introducing air into the regenerator vessel 96 is connected to the bottom thereof. An air compressor 102 is provided, the discharge of which is connected to the conduit 100 by a conduit 104. A standpipe 106 for receiving regenerated catalyst is disposed in the lower portion of the regenerator vessel 96 and is sealingly attached to a conduit 108 connected to the bottom of the reactor 96. The conduit 108 is connected to the riser 86, and a conduit 110 is connected to the riser 86 for conducting preheated petroleum feed stock thereto.

A shutoff valve assembly 10 of the present invention described above and illustrated in FIGS. 1 through 4 is disposed in the conduit 92 for shutting off the flow of catalyst-oil mixture through the conduit 92. A second shutoff valve assembly 10 of the present invention is disposed in the conduit 108 for shutting off the flow of regenerated catalyst therethrough.

As will be understood, the apparatus 80 includes control instruments and flow control valves for controlling the operation thereof which are not shown in FIG. 7.

OPERATION OF THE APPARATUS 80

In operation of the apparatus 80 for carrying out the catalytic cracking of petroleum feed stock the reactor 82 and feed riser 86 are charged with finely divided solid catalyst. The petroleum feed stock to be cracked is pre-heated in a furnace (not shown) and introduced by way of the conduit 110 into the feed riser 86. The feed stock is heated as it flows through the riser 86 by contact with hot, regenerated catalyst flowing thereinto by way of the conduit 108 bringing it to the desired vapor temperature which is usually in the range of from about 890° to about 960°F. The resultant vapors flow up through the riser 86 into the reactor 82 entraining the particulated catalyst therewith and forming a fluidized bed of catalyst within the reactor 82. The cracked vaporized feed stock passes from the catalyst bed and reactor 82 by way of the conduit 88 attached thereto to a fractionating system.

Oil, generally referred to as carbon, is deposited on the catalyst during the cracking reaction. The spent catalyst-oil mixture from the reactor 82 flows by gravity into and through the steam stripping column 90 wherein it is countercurrently contacted with steam passing upwardly through the column 90 so that a portion of the adsorbed and entrapped oil vapors are removed from the spent catalyst and returned to the reactor 82 from where they ultimately flow to the fractionator system by way of the conduit 88. The catalyst reaching the bottom of the stripper 90 still having some oil deposited thereon flows by gravity through the conduit 92 and the shutoff valve assembly 10 into the regenerator vessel 96. An air stream produced by the air compressor 102 flows by way of the conduit 104 and conduit 100 connected to the bottom of the regenerator 96 upwardly through the regenerator 96 entraining the catalyst and conveying it into the upper portion of the regenerator 96 where the oil contained on the catalyst is burned off, generally at temperatures in the range of from about 1,150° to 1,350°F. The resulting hot regenerating catalyst flows by gravity into and through the standpipe 106, the conduit 108 and the shutoff valve assembly 10 disposed therein into the feed riser 86 whereby it is again entrained by the feed stock entering the feed riser by way of the conduit 110 connected thereto. Thus, the finely divided solid catalyst is circulated through the feed riser into the catalytic reaction zone within the reactor 82, through the steam stripping column 90, into the regeneration zone within the regenerator 96 and back into the feed riser 86.

The catalyst-oil or carbon material flowing through the conduit 92 and the shutoff valve assembly 10 disposed therein is at a super-atmospheric pressure, i.e., a pressure in the range of from about 25 to 40 psig and a temperature of from about 900° to about 1,000°F. The regenerated catalyst flowing through the conduit 108 and the valve assembly 10 disposed therein is under approximately the same super-atmospheric pressure as the material flowing through the conduit 92 and has a temperature of from about 1,150° to 1,350°F.

During normal operation of the apparatus 80 the shutoff valve assemblies 10 are maintained in the open position and other flow regulating valves incorporated in the apparatus 80 are used to control process variables. The shutoff valve assemblies 10 are usually operated by automatic operators responsive to control signals and are closed either automatically when an abnormal pressure or temperature condition is reached within the apparatus 80, or other emergency condition exists, or during normal shut-down and start-up of the apparatus 80. Thus, the shutoff valves 10 can remain in the fully opened position for long periods of time during which time, prior to the present invention, catalyst and/or catalyst-oil mixtures entered close clearance areas in the shutoff valves between the valve stems and valve bodies thereof causing the valve stems to seize and the shutoff valves to become inoperable. Through the use of the shutoff valve assemblies 10 of the present invention described above, however, the catalyst and catalyst-oil mixtures are prevented from entering close clearance areas between the valve stems and the valve bodies thereof thereby preventing such valve stem seizure and insuring proper operation of the shutoff valve assemblies 10 during an emergency or other shutdown.

Thus, the present invention is well adapted to carry out the objects and attain the ends and advantages mentioned as well as those inherent therein. While presently preferred embodiments of the invention have been described for purposes of this disclosure, numerous changes in the arrangement of parts and construction thereof will be readily apparent to those skilled in the art. For example, the guide member 48 and spacing members 54 can be formed as one integral part with the grooves 60 machined into the insides surfaces thereof. Consequently, such changes are encompassed within the spirit of this invention which is to be limited only by the lawful scope of the appended claims.

What is claimed is:

1. In an apparatus for carrying out a petroleum fluid catalytic cracking process, said apparatus including a catalytic reactor and a catalyst regenerator connected by conduit means through which particulated catalyst and mixtures of particulated catalyst and oil flow at superatmospheric pressure and high temperature, and including at least one shutoff valve disposed in said conduit means, the improvement wherein:

said shutoff valve includes a valve stem disposed in a valve body, a valve stem guide means in and attached to said body, and a valve stem packing gland positioned between said guide means and the exterior of said valve body, and wherein said valve stem guide means comprises:

a. a cylindrical guide member having a bore therethrough in which said valve stem is slidably disposed;

b. at least one annular groove disposed in said bore; and at least one expansible seal ring disposed within said groove around said valve stem, said seal ring being of a size and shape such that a seal is provided thereby between said valve stem and the inside surfaces of said groove whereby pressurized materials present within said valve body are prevented from flowing through said guide means into said valve stem packing gland and other areas of close clearance between said valve stem and said valve body.

2. The apparatus of claim 1 wherein:

a. a plurality of annular grooves are disposed in said bore;

b. a plurality of expansible seal rings are disposed within said annular grooves around said valve stem; and c. said cylindrical guide member has threads on a portion of the outside surface thereof adapted for attachment to complementary threads disposed in said valve body.

* * * * *